(12) United States Patent
Diorio et al.

(10) Patent No.: US 7,501,953 B2
(45) Date of Patent: Mar. 10, 2009

(54) RFID READERS TRANSMITTING PREAMBLES DENOTING COMMUNICATION PARAMETERS AND RFID TAGS INTERPRETING THE SAME AND METHODS

(76) Inventors: Christopher J. Diorio, 17001 NW. 15th Ave., Shoreline, WA (US) 98177; Scott Anthony Cooper, 7315 Earl Ave. NW., Seattle, WA (US) 98117

(\*) Notice: Subject to any disclaimer, the term of this patent is extended or adjusted under 35 U.S.C. 154(b) by 996 days.

(21) Appl. No.: 10/890,976

(22) Filed: Jul. 13, 2004

(65) Prior Publication Data
US 2005/0225447 A1   Oct. 13, 2005

Related U.S. Application Data

(63) Continuation-in-part of application No. 10/823,991, filed on Apr. 13, 2004, now Pat. No. 7,183,926.

(60) Provisional application No. 60/570,247, filed on May 11, 2004.

(51) Int. Cl.
 H04Q 5/22     (2006.01)
 H04Q 1/30     (2006.01)
 G08B 13/14    (2006.01)
 G08B 5/22     (2006.01)
 H04L 7/00     (2006.01)

(52) U.S. Cl. .............. 340/572.4; 340/10.3; 340/7.43; 340/825.21

(58) Field of Classification Search ............ 370/468, 370/470, 471, 473; 340/10.1–10.51, 572.1–572.9, 340/7.43, 825.2, 825.21; 455/41.2, 41.3, 455/556.1, 556.2, 136; 709/209, 233, 224, 709/237
See application file for complete search history.

(56) References Cited

U.S. PATENT DOCUMENTS

| | | | |
|---|---|---|---|
| 4,701,755 A * | 10/1987 | Nakagawa et al. | 340/825.02 |
| 4,783,783 A | 11/1988 | Nagai et al. | |
| 4,935,702 A | 6/1990 | Mead et al. | |
| 5,164,942 A * | 11/1992 | Kamerman et al. | 370/334 |
| 5,307,515 A | 4/1994 | Kuo et al. | |
| 5,491,484 A | 2/1996 | Schuermann | |
| 5,640,151 A * | 6/1997 | Reis et al. | 340/10.2 |

(Continued)

FOREIGN PATENT DOCUMENTS

EP        0 298 618       1/1989

(Continued)

OTHER PUBLICATIONS

Invitation to Pay Additional Fees (Partial International Search), Application No. PCT/US 03/31792, date of mailing Apr. 22, 2004.

(Continued)

*Primary Examiner*—Benjamin C Lee
*Assistant Examiner*—Jennifer Mehmood

(57) ABSTRACT

RFID readers transmit data to query RFID tags. Before transmitting the data, the RFID readers also transmit special preambles that inform of parameters of communication that are to be used. RFID tags decode the preamble, and adjust accordingly to optimize the communication. The preambles of the invention start with a delimiter that has a substantially constant duration regardless of the communication parameters that will be used, such as transmission data rate.

117 Claims, 9 Drawing Sheets

U.S. PATENT DOCUMENTS

| | | | | |
|---|---|---|---|---|
| 5,686,902 | A | 11/1997 | Reis et al. | |
| 5,805,632 | A | 9/1998 | Leger | |
| 5,933,039 | A | 8/1999 | Hui et al. | |
| 5,939,945 | A | 8/1999 | Thewes et al. | |
| 5,952,922 | A | 9/1999 | Shober | |
| 5,952,935 | A | 9/1999 | Mejia et al. | |
| 6,130,632 | A | 10/2000 | Opris | |
| 6,134,182 | A | 10/2000 | Pilo | |
| 6,147,591 | A * | 11/2000 | Stobbe et al. | 340/10.51 |
| 6,177,861 | B1 | 1/2001 | MacLellan et al. | |
| 6,208,235 | B1 | 3/2001 | Trontelj | |
| 6,266,362 | B1 | 7/2001 | Tuttle et al. | |
| 6,317,027 | B1 | 11/2001 | Watkins | |
| 6,320,788 | B1 | 11/2001 | Sansbury et al. | |
| 6,357,025 | B1 | 3/2002 | Tuttle | |
| 6,603,391 | B1 | 8/2003 | Greeff et al. | |
| 6,765,484 | B2 | 7/2004 | Eagleson et al. | |
| 6,831,562 | B2 | 12/2004 | Rodgers et al. | |
| 7,005,965 | B2 | 2/2006 | Chen et al. | |
| 7,039,412 | B2 * | 5/2006 | Sandhu et al. | 455/445 |
| 7,215,976 | B2 * | 5/2007 | Brideglall | 455/552.1 |
| 7,356,316 | B2 * | 4/2008 | Ogiso et al. | 455/127.5 |
| 2001/0010491 | A1 | 8/2001 | Marneweck et al. | |
| 2002/0153996 | A1 * | 10/2002 | Chan et al. | 340/10.4 |
| 2002/0167405 | A1 | 11/2002 | Shanks et al. | |
| 2004/0174244 | A1 | 9/2004 | Eidemiller | |
| 2005/0025187 | A1 * | 2/2005 | Li et al. | 370/476 |
| 2005/0104790 | A1 | 5/2005 | Duron | |
| 2005/0128159 | A1 | 6/2005 | Wang et al. | |

FOREIGN PATENT DOCUMENTS

| | | |
|---|---|---|
| EP | 0 681 192 | 11/1995 |
| EP | 0 696 852 | 2/1996 |
| EP | 0 715 417 | 6/1996 |
| EP | 0 939 496 | 9/1999 |
| WO | 01 73854 | 10/2001 |

OTHER PUBLICATIONS

Carley, L. Richard, "Trimming Analog Circuits Using Floating-Gate Analog MOS Memory", IEEE Journal of Solid-State Circuits, vol. 24, No. 6, Dec. 1989, pp. 1569-1575.

Jonietz, Erika, "Tracking Privacy", Technology Review, Jul./Aug. 2004, pp. 74-75.

Raszka et al., "Embedded Flash Memory for Security Applications in a 0.13 μm CMOS Logic Process", Digest of Technical Papers, IEEE International Solid-State Circuits Conference 2004, p. 46.

Weis, Stephen A., et al., Security and Privacy Aspects of Low-Cost Radio Frequency Identification Systems, Laboratory for Computer Science, Auto-ID Center, Massachusetts Institute of Technology, pp. 1-12.

Yoshida, Junko, "RFID "kill" Feature Aims to Soothe Privacy Fears", EE Times, Apr. 28, 2003, pp. 1, 86.

* cited by examiner

*PREAMBLE PORTIONS*

*PROTOCOL PORTION COMPONENTS*

*COMMUNICATION PARAMETER ENCODING OPTIONS*

1000 →

| DUTY CYCLE | DECODED VALUE(S) |
|---|---|
| DCA | FM0 |
| DCB | FM0 |
| DCC | MANCHESTER |
| DCD | MANCHESTER |

*DECODING THE MODE FOR ENCODING THE BACKSCATTERED SYMBOLS*

| DUTY CYCLE | DECODED VALUE(S) | |
|---|---|---|
| DCA | 40 kbps | x1 |
| DCB | 80 kbps | x2 |
| DCC | 160 kbps | x4 |
| DCD | 320 kbps | x8 |

*DECODING THE RATE OF BACKSCATTERED DATA*

| DUTY CYCLE | DECODED VALUE(S) |
|---|---|
| DCA | 1.5 |
| DCB | 1.5 |
| DCC | 2.0 |
| DCD | 2.0 |

*DECODING THE RATIO OF SYMBOL DURATIONS*

| ENCODING | ENC1 | ENC2 |
|---|---|---|
| SYMBOL 0 | ⎍ | ⎍ |
| SYMBOL 1 | ⎍ | ⎍ |
| SYMBOL DURATION RATIO | 1.5 | 2.0 |

*RATIO OF SYMBOL DURATIONS*

| SYMBOL DURATION RATIO | 1.5 | 2.0 |
|---|---|---|
| CHECKPOINT VALUE (E.G. AVG) | 1.25 | 1.5 |
| CHECKPOINT LOCATION | ⇩ | ⇩ |
| SYMBOL 0 | ⎍ | ⎍ |
| SYMBOL 1 | ⎍ | ⎍ |

*CHECKING FOR TRANSITION(S)*

FIGURE 11B

*RFID READER METHOD*

*RFID TAG METHOD*

RFID READERS TRANSMITTING PREAMBLES DENOTING COMMUNICATION PARAMETERS AND RFID TAGS INTERPRETING THE SAME AND METHODS

RELATION TO OTHER APPLICATIONS

This application claims benefit of U.S. Provisional Patent Application Ser. No. 60/570,247 filed May 11, 2004 in the name of inventors John D. Hyde and Christopher J. Diorio entitled "RFID Readers Transmitting Preambles For Data At Different Transmission Rates And Software And Methods" and being commonly assigned herewith. This application is also a continuation-in-part of U.S. patent application Ser. No. 10/823,991, filed Apr. 13, 2004 now U.S. Pat. No. 7,183,926 in the name of inventors Christopher J. Diorio, Scott Anthony Cooper, John D. Hyde, Amir Sarajedini and Kurt Eugene Sundstrom, entitled "Adaptable Bandwidth RFID Tags", all commonly assigned herewith, and which is hereby incorporated by reference in its entirety. This application may be found to be related to another U.S. Patent Application titled "RFID Readers Transmitting Preambles Denoting Data Rate And Methods", filed on the same day as the present application, receiving Ser. No. 10/890,662 and assigned commonly herewith, and which is hereby incorporated by reference in its entirety.

FIELD OF THE INVENTION

The present invention is related to the field of Radio Frequency IDentification (RFID) readers and tags, and more specifically to RFID readers able to denote in the preamble communication parameters for their impending data transmission, and tags receiving the preamble and adjusting accordingly to receive the data.

BACKGROUND

Radio Frequency IDentification (RFID) systems include RFID readers and RFID tags. The tags can be used in many ways for locating and identifying objects that they are attached to. RFID tags are particularly useful in product-related and service-related industries for tracking large numbers of objects are being processed, inventoried, or handled. In such cases, an RFID tag is usually attached to individual items, or to their packages.

In principle, RFID techniques entail using an RFID reader to interrogate one or more RFID tags. Interrogation is performed by the reader transmitting a Radio Frequency (RF) wave. A tag that senses the interrogating RF wave responds by transmitting back another RF wave, a process known as backscatter. Backscatter may take place in a number of ways. The response may further encode a number stored internally in the tag. The response, and the number if available, is decoded by the reader, which thereby identifies, counts, or otherwise interacts with the associated item. The number can denote a serial number, a price, a date, a destination, other attribute(s), any combination of attributes, and so on.

An RFID tag typically includes an antenna system, a power management section, a radio section, a logical section, and a memory. Advances in semiconductor technology have miniaturized the electronics so much that an RFID tag can generate the backscatter while powered by only the RF signal it receives, enabling some RFID tags to operate without a battery.

A challenge in the operation of RFID systems arises when a tag or population of tags does not know how to communicate with a reader. A number of communication parameters may be at issue, for example the reader's transmission data rate, a ratio of duration of the different symbols, the expected backscatter rate, and so on.

Another challenge in the operation of RFID systems arises from interference, when other RF signals are also transmitted in the vicinity at the same time. Interfering RF signals may be generated, for example, from nearby wireless devices such as other RFID readers, and also cordless telephones, wireless baby monitors, and the like. In those instances, an RFID tag cannot detect the interrogating RF wave reliably, or parse its commands.

BRIEF SUMMARY

The invention improves over the prior art. Briefly, the present invention provides RFID readers and methods for transmitting data to query tags. Before transmitting the data, the RFID readers also transmit special preambles that inform of parameters of communication that are to be used. The invention also provides RFID tags and methods for decoding the preamble, and adjusting accordingly to optimize the communication.

The preambles of the invention therefore communicate and convey the communication parameters from the reader to the tag. The preambles of the invention start with a delimiter that has a substantially constant duration regardless of the communication parameters that will be used, such as transmission data rate. In fact, it is preferred that this duration be set according to an assumed state of the tag. The preambles of the invention also include a protocol portion, which encodes one or more of the desired communication parameters.

Additionally, while waiting for a preamble, all tags can set their bandwidth at the same setting. This setting may be chosen advantageously to be of the lowest bandwidth. In parallel, the state of the tag assumed by the reader for purposes of the duration of the preamble's delimiter can be that the tag bandwidth setting is at the lowest bandwidth.

In some embodiments of the invention, the RFID reader can choose one of many data rates, for itself, the tag, or both. This is especially advantageous where interference is detected, and transmission at a more suitable data rate is attempted. Indeed, when an RFID reader detects that there is interference, it may lower the data rate of its transmission, and further command the tag to do the same. This will permit data to be received with better rejection of interference, and more robust subsequent analysis.

These and other features and advantages of the invention will be better understood from the specification of the invention, which includes the following Detailed Description and accompanying Drawings.

BRIEF DESCRIPTION OF THE DRAWINGS

The invention will become more readily apparent from the following Detailed Description, which proceeds with reference to the accompanying drawings, in which:

FIGS. 10A, 10B, 10C are tables illustrating how the variable duty cycle of the violation of FIG. 9 can encode a value of a communication parameter.

FIG. 11A is a table of how different symbols in different encodings can have different duration ratios, which can be communicated according to the invention.

FIG. 11B is a table of how the communicated symbol duration ratio of FIG. 11A may be used to check incoming symbols.

DETAILED DESCRIPTION

Figure 1:
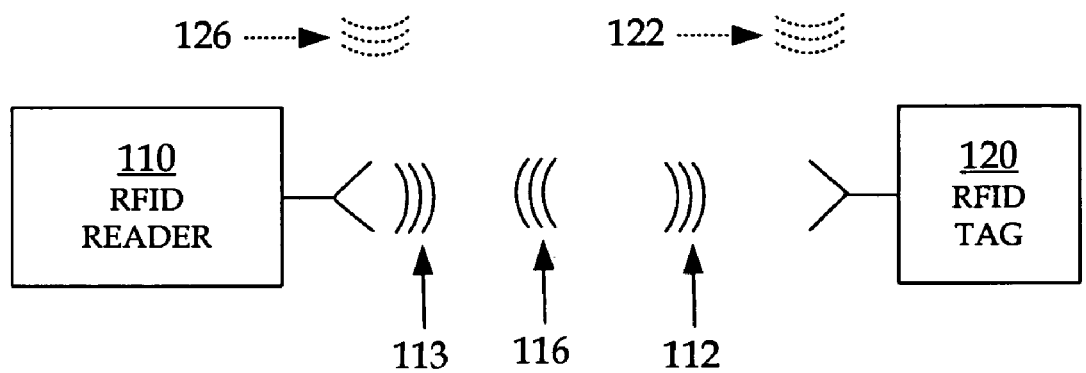
FIG. 1 is a block diagram of an RFID reader made according to the invention, interacting with an RFID tag made according to the invention.

The present invention is now described. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or an embodiment combining software and hardware aspects. This description is, therefore, not to be taken in a limiting sense.

As has been mentioned, the present invention provides RFID readers and methods for transmitting data to query tags. The RFID readers also transmit special preambles for these data transmissions, which denote communication parameters of the transmission. The invention also provides RFID tags and methods for receiving these preambles, decoding them, and adjusting accordingly to optimize the communication. The invention is now described in more detail.

An RFID reader might want to exchange data with an RFID tag at different data rates, which are also called link rates and just rates. In general, a higher data rate will result in a quicker transmission time, which is desirable. In the presence of interference, however, detection of the RFID signals might not be robust at the higher rates, and a lower rate might be desired. An example is described below.

FIG. 1 is a diagram of an RFID system 100, where an RFID reader 110 made according to an embodiment of the invention interacts with an RFID tag 120 made according to an embodiment of the invention, as is preferred. In other embodiments, RFID reader 110 might interact with tags that are not made according to the invention, and RFID tag 120 might interact with readers that are not made according to the invention.

RFID reader 110 transmits an interrogating RF wave, which may be continuous. Two RF signals 112, 113 of the interrogating RF wave are shown as discontinuous, to denote their possibly different treatment, but that is only for illustration and they may, in fact, be part of the same continuous signal. RFID tag 120 in the vicinity of RFID reader 110 may sense the interrogating RF wave, and generate backscatter 116. RFID reader 110 senses and interprets backscatter 116.

In the vicinity of system 100 there is also interference, shown here in the form of RF waves 122, 126 from another other source (not shown). RF wave 126 arrives at reader 110 at the same time as backscatter signal 116. While RF wave 126 might not have the same carrier frequency as backscatter signal 116, it might nevertheless generate interference. Reader 110 may infer accordingly that RF wave 122 is also arriving at tag 120 at the same time as intended interrogating signal 112, and be generating interference in the tag. Accordingly, RFID reader 110 might want to use a different rate to transmit to tag 120.

Different link rates may be used. Their values may be selected from a continuum, such as being continuously variable between two endpoints, such as 32 kbps and 128 kbps. ("kbps" stands for 1000 bits per second.) Alternately, values of link rates may be selected from one or more groups of values. One group that can be chosen is approximately 32 kbps, approximately 64 kbps, and approximately 128 kbps. Another group is approximately 40 kbps, approximately 80 kbps, and approximately 160 kbps. One more group is approximately 26.7 kbps, approximately 53.3 kbps, and approximately 106.7 kbps, which can advantageously be used for 2/1 Pulse Interval Encoding ("PIE").

Figure 2:
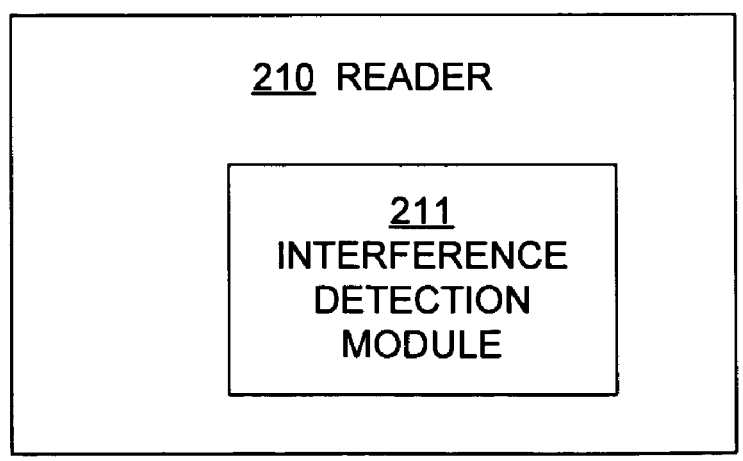
FIG. 2 is a block diagram of the RFID reader of FIG. 1 according to an embodiment of the invention that includes an interference detection module.

FIG. 2 is a block diagram of RFID reader 210 according to an embodiment of the invention. Reader 210 may be employed for reader 110 in FIG. 1, but that is not necessary. Reader 210 includes an interference detection module 211, which is used for detecting the presence of signal 126, and thus also inferring the presence of signal 122. Module 211 may be implemented in any way known in the art, such as by software, hardware such as with analog or digital components, microprocessors, Application Specific Integrated Circuits (ASICs), and so on.

Module 211 has an output as to whether interference is taking place, and a link rate is selected according to the output. A module 211 is not required, however, to practice the invention, and an RFID reader according to the invention might decide on rates not based on detecting interference.

Figure 3:
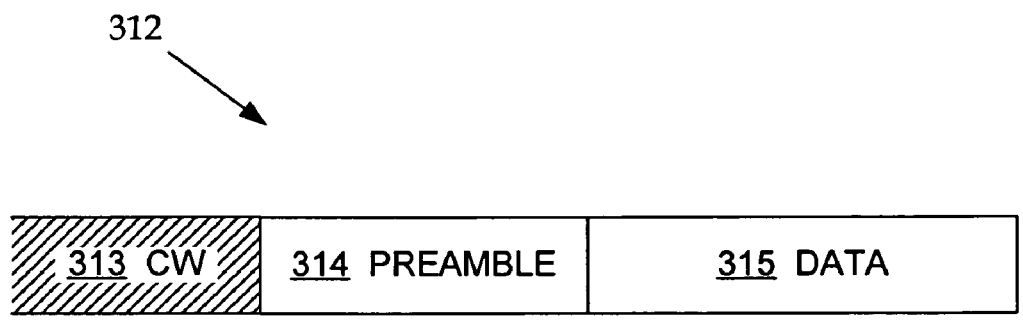
FIG. 3 is a data diagram showing a possible relationship of a preamble to transmitted data.

FIG. 3 is a data diagram showing a transmission 312 from a reader to a tag, which may be encoded in signals 112, 113, a continuous version of them, and so on. A reader may first transmit a Continuous Wave ("CW") portion 313, then a preamble 314, and then data 315.

Figure 4:
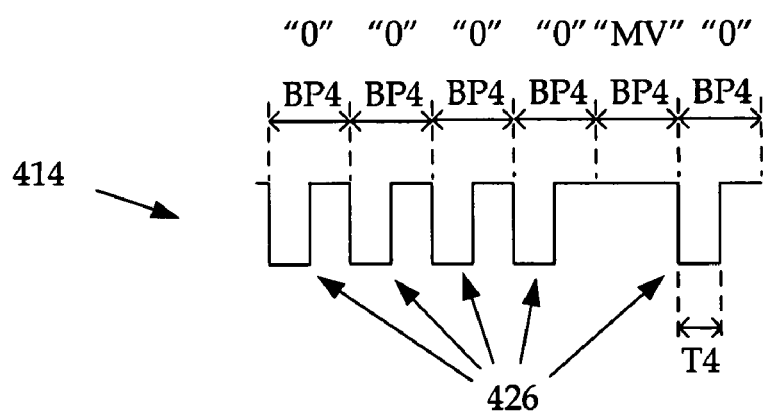
FIG. 4 is a waveform depicting a preamble in the prior art.

FIG. 4 is a waveform depicting a preamble 414, determined by convention in the prior art. Preamble 414 includes five low pulses 426, each of which has the same duration T4. The exact arrangement of low pulses 426 is along 6 consecutive bit periods, each with a duration BP4 as shown. The first four of the 6 bit periods include a low-to-high transition, which by convention is also known as an encoded symbol "0". The fifth bit period contains no transition, which is a specific type of violation MV. The sixth bit period contains another low-to-high transition, and completes the preamble 414.

Preamble 414 has problems, if it is to be used for different transmission rates. The entire waveform would scale, so that bit period BP4 (and low pulse duration T4) would be preserved according to the data rate. The problem is that different data rates might vary by a factor of two or four from each other. A bandwidth setting in the tag that can detect transmission at one rate may fail in the other, since the pulses of preamble 414 will have such a different timing and width.

Figure 5:
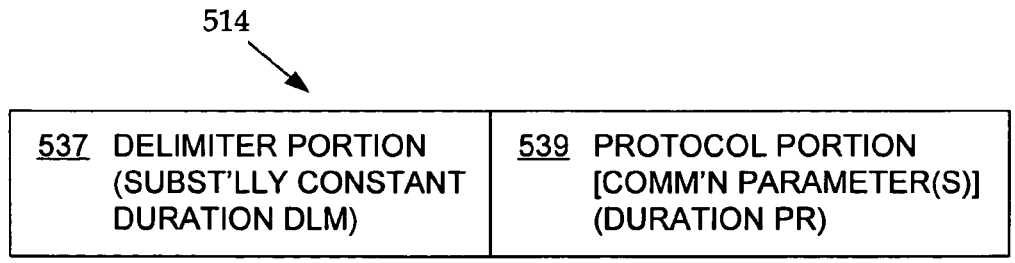
FIG. 5 is a diagram showing portions of a preamble transmitted by a reader and received and interpreted by a tag, both made according to the present invention.

FIG. 5 shows aspects of a preamble 514 transmitted by a reader made according to an embodiment of the invention, and also received and interpreted by a tag made according to the invention. Preamble 514 includes a delimiter potion 537 and a protocol portion 539. Delimiter potion 537 has a duration substantially equal to a preset delimiter duration. In some embodiments, the preset delimiter duration is either approximately 12.5 μsec, or approximately 6.25 μsec.

Protocol portion 539 encodes one, and maybe more communication parameters for the exchange of the data that will follow the preamble. As will be seen in more detail below, these parameters can include a mode for the tag to encode the backscattered symbols, a tag backscatter rate, either in absolute values or in a form relative to the reader's transmission data rate, a ratio of symbol durations depending on the exact encoding, a transmission data rate of the reader to the tag, and so on.

The one or more communication parameters can be fixed for the reader. Alternately, the reader can determine the parameter from a number of options, and encode it in the protocol portion 539. Determining can be in accordance with environmental conditions such as the presence of interference, and so on.

Protocol portion 539 may be embodied by any pattern that identifies the start of a transmission of data, which is also known as a packet. The pattern has at least one feature whose timing encodes the one or more communication parameters. The feature can include a pulse, and the timing can be that of the duration and/or duty cycle of the pulse.

Figure 6:
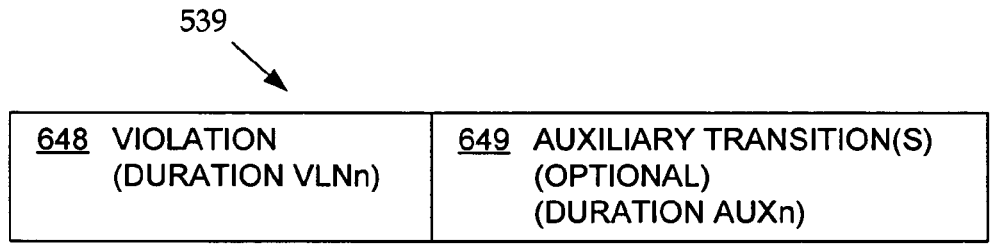
FIG. 6 is a diagram showing components of a protocol portion of the preamble of FIG. 5.

FIG. 6 is a diagram showing components of protocol portion 539 of preamble 514, according to some embodiments where the above-mentioned pattern is a violation. Protocol portion 539 includes a violation 648, and an optional group of auxiliary transitions 649. As will be seen in examples below, violation 648 has a duration VLNn, and group 649 has a duration AUXn, where "n" can take number value in some instances.

Figure 7:
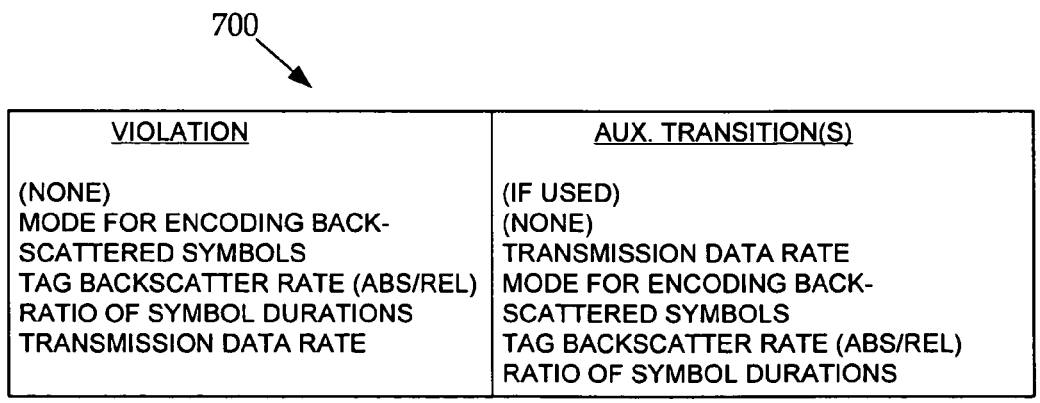
FIG. 7 is a table showing options to encode communication parameters in the protocol portion components of FIG. 6 according to various embodiments of the present invention.

FIG. 7 is a table 700 that shows options to encode the various communication parameters in violation 648 and group 649 of auxiliary transitions according to various embodiments of the invention.

FIGS. 8A, 8B, 8C, 8D show waveform embodiments of a preamble transmitted by a reader and received and interpreted by a tag, both made according to the present invention. It will be recognized that the waveforms of FIGS. 8A, 8B, 8C, 8D have the portions described in FIG. 5, where the protocol portion has the components described in FIG. 6.

Figure 8A:
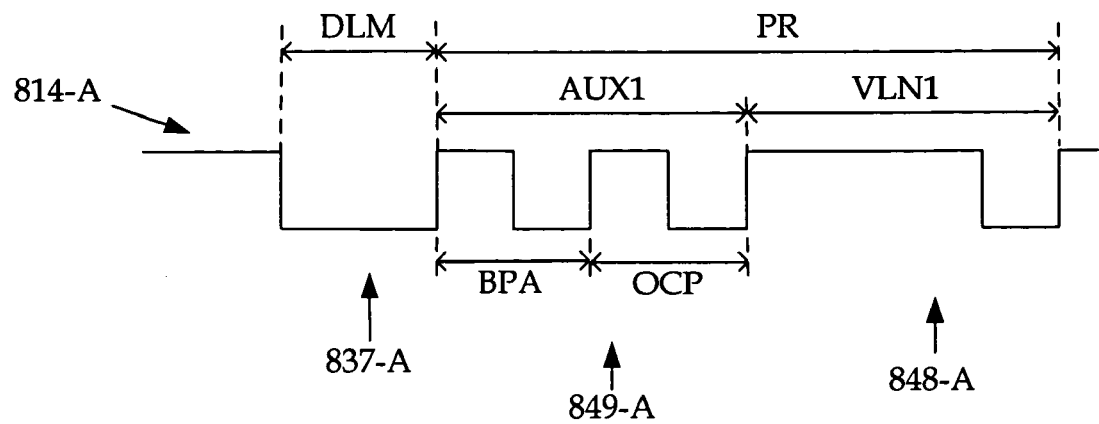
FIGS. 8A, 8B, 8C, 8D show waveform embodiments of a preamble transmitted by a reader and received and interpreted by a tag, both made according to the present invention.

FIG. 8A shows a waveform 814-A that has a delimiter 837-A with a duration DLM that is substantially constant regardless of the rate of exchange of data. Waveform 814-A also has a protocol portion with a duration PR. The protocol portion includes a violation 848-A and a group 849-A of auxiliary transitions. Violation 848-A has a duration VLN1, while group 849-A of auxiliary transitions has a duration AUX1. Group 849-A of auxiliary transitions further defines two timings BPA and OCP.

Figure 8B:
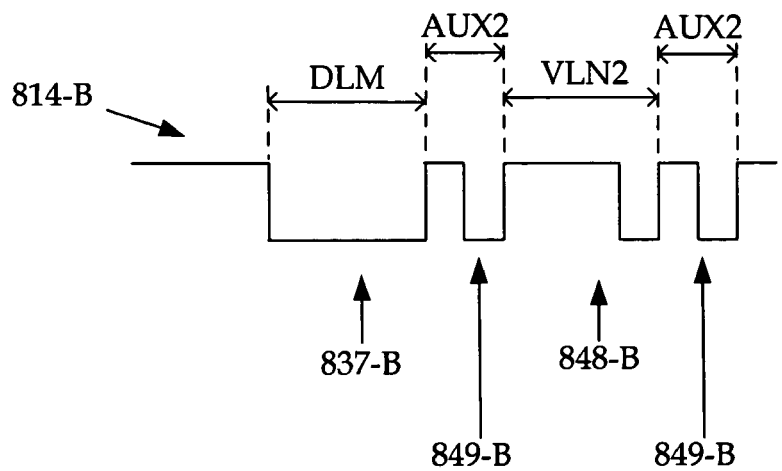

FIG. 8B shows a waveform 814-B that has a delimiter 837-B with a duration DLM as per the above. Waveform 814-B also has a violation 848-B with a duration VLN2, and two groups 849-B of auxiliary transitions, each with a duration AUX2.

Figure 8C:
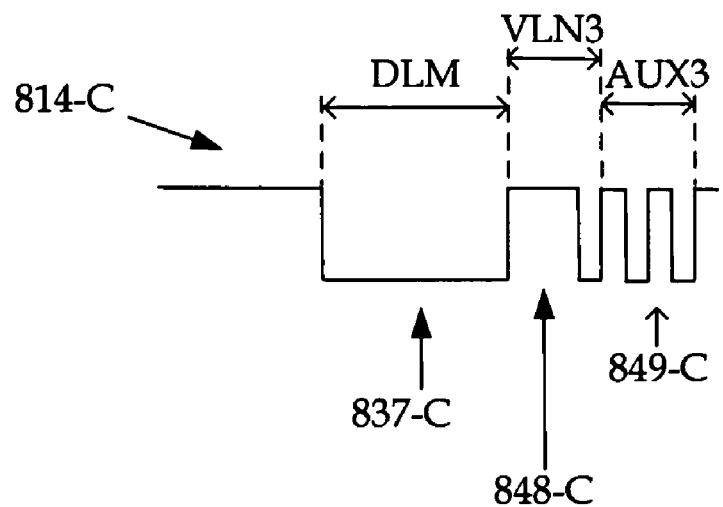

FIG. 8C shows a waveform 814-C that has a delimiter 837-C with a duration DLM as per the above. Waveform 814-C also has a violation 848-C with a duration VLN3, and a group 849-C of auxiliary transitions having a duration AUX3.

Figure 8D:
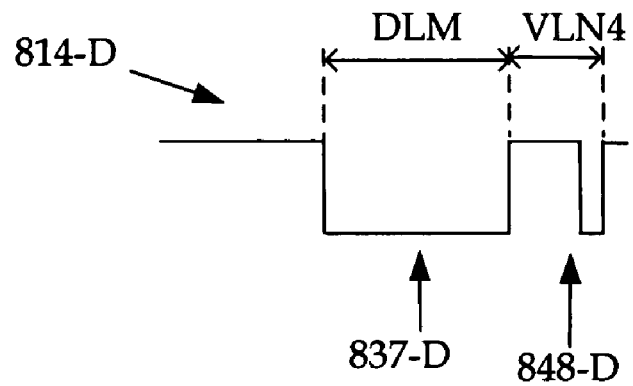

FIG. 8D shows a waveform 814-D that has a delimiter 837-D with a duration DLM as per the above. Waveform 814-D also has a violation 848-D with a duration VLN4, but no auxiliary transitions.

It can be observed that the waveforms of FIGS. 8A, 8B, 8C, 8D have components that are arranged similarly in some ways and differently in other ways. Notably, a group of auxiliary transitions is only optional, and may be provided before, after, and before and after the violation.

There are various ways for an RFID reader of the invention to encode the communication parameters in the preamble, and corresponding ways for an RFID tag of the invention to decode them. Encoding may take place in the violation or in the timing of the auxiliary transitions or both, as per table 700.

For example, in waveform 814-A, two timings are defined in durations BPA, OCP. The durations could be explicit, or encode information in terms of their duty cycle. For example, duration BPA could be the duration of the bit period, and thus implicitly convey the reader data transmission rate. Additionally, duration OCP could convey another communication parameter, whether in its explicit duration, or in its duty cycle while the duration is the same as duration BPA.

An additional example is described below, with reference to the violation. It will be recognized that the example below is applicable to the violation feature of all four waveforms 814-A, 814-B, 814-C, 814-D.

Figure 9:
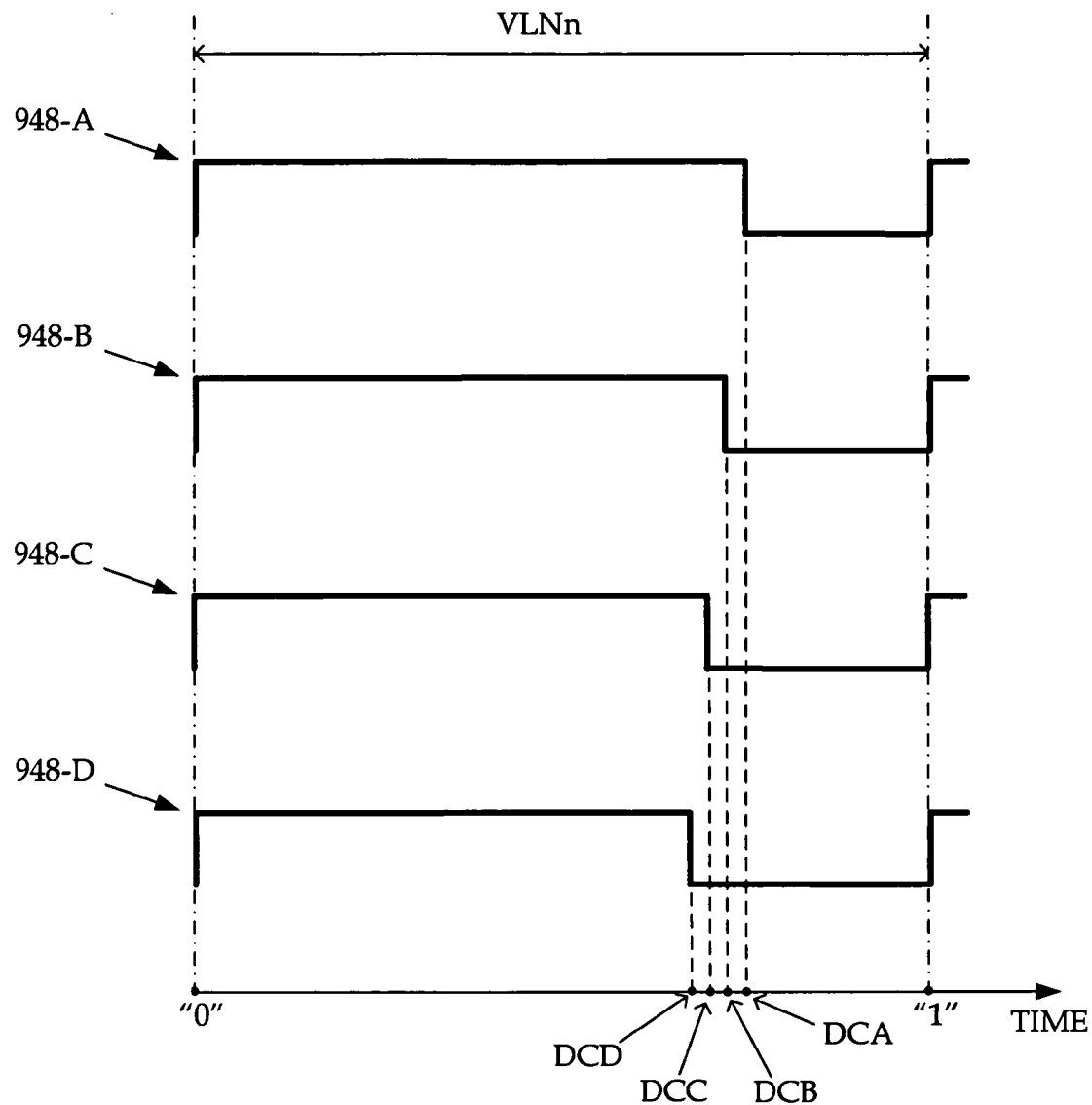
FIG. 9 shows four waveforms for encoding different values of a communication parameter in a variable duty cycle of a violation component of a preamble transmitted by a reader and received and interpreted by a tag made according to the present invention.

FIG. 9 shows four waveforms 948-A, 948-B, 948-C, 948-D of a violation having a duration VLNn. Waveforms 948-A, 948-B, 948-C, 948-D are particular cases of the violation, each time a encoding a different value in its variable duty cycle. While the duration is VLNn in each case, that is plotted in a normalized way on a time axis. Accordingly, the beginning of waveforms 948-A, 948-B, 948-C, 948-D happens at time "0", and the end at time "1". The down-transitions of waveforms 948-A, 948-B, 948-C, 948-D take place at respective times DCA, DCB, DCC, DCD, which correspond to the different duty cycle values. Accordingly, these encode different values for communication parameters. While only four values are shown, that is only for example and not by way of limitation. More values can be envisioned.

FIGS. 10A, 10B, 10C are tables illustrating how the variable duty cycle of the violation of FIG. 9 can encode a value of a communication parameter. In each case, duty cycle values of DCA, DCB, DCC, DCD communicate different values for the communication parameter, as decided by convention.

FIG. 10A shows a table 1000, where the values decoded from the duty cycle convey which mode a tag should use to encode the backscattered symbols. In the example of table 1000, two different such encodings may be communicated, namely the FM0 encoding and the Manchester type encoding that are themselves known in the art.

FIG. 10B shows a table 1030, where the values decoded from the duty cycle convey what should be the rate of the backscattered data. In the example of table 1030, two different implementations are shown. In one implementation, shown in one column, absolute values are conveyed, such as in units of kpbs. In another implementation, shown in the other column, relative values are conveyed in connection with the reader's transmission data rate. The actual rate (or period) is determined as a multiple of the rate of period of the reader's transmission data rate. In that implementation, the reader's transmission data rate must also be found, which can take place otherwise, such as from duration BPA of waveform 814-A.

FIG. 10C shows a table 1060, where the values decoded from the duty cycle convey what is the ratio of symbol durations of the data transmitted by the reader. In the example of table 1060, two different values are shown, and their use is described below.

FIG. 11A is a table 1100 that shows how the symbols "0" and "1" can be encoded in different encodings ENC1, ENC2 by a reader according to the invention. In addition, the symbols have different durations in encodings ENC1, ENC2, and also these durations have different ratios. These ratios can be communicated by encoding their value in the preamble.

FIG. 11B is a table 1150 that shows how the communicated symbol duration ratio (SDR) of FIG. 1A may be used to check incoming symbols. A checkpoint value (CPV) is calculated from the SDR according to the formula CPV=0.5+SDR/2. The CPV corresponds to a checkpoint location with respect to the waveform. The processor waits for an up-transition. If one is received, then the incoming symbol is a "0". If one has not been received by the time the CPV occurs, then the incoming symbol is inferred to be a "1".

The examples of FIGS. 11A, 11B are shown with specific types of sample encodings. Equivalently, inverse encodings can be used, where a different transition may be checked for by the CPV. Further, instead of a reader encoding and conveying to a tag the SDR, it may equivalently encode and convey a suggested CPV.

Figure 12:
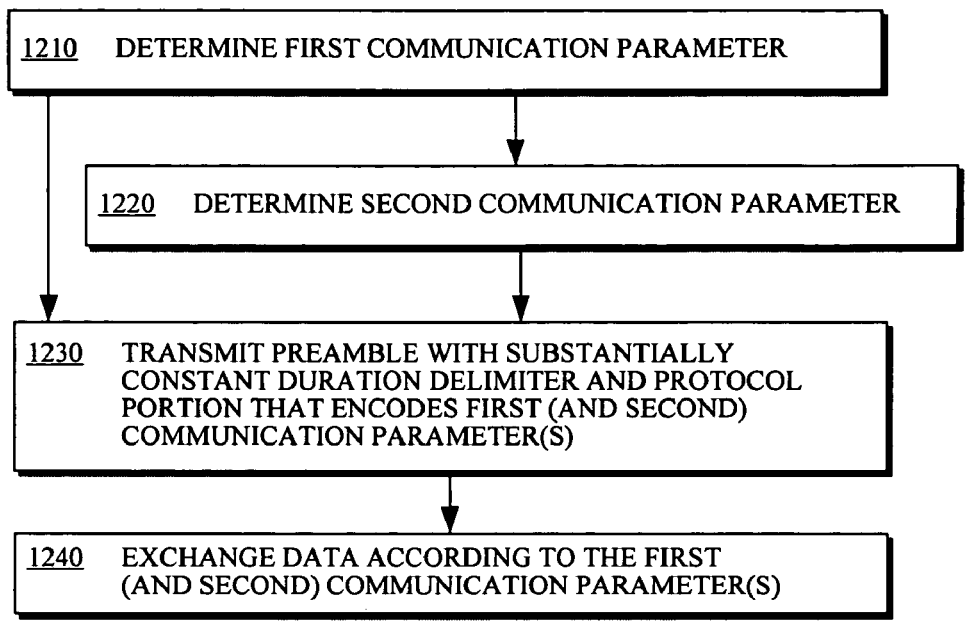
FIG. 12 is a flowchart illustrating a method for an RFID reader according to an embodiment of the invention.

FIG. 12 is flowchart 1200 illustrating a method for an RFID reader that is made according to an embodiment of the invention. The method of flowchart 1200 may be practiced by different embodiments of the invention, including but not limited to reader 110.

At block 1210, a first communication parameter is determined, such as those shown in FIG. 7. For example, a data rate may be determined; and the determination may be affected if interference is detected.

At optional next block 1220, a second communication parameter is determined, such as from the same set. A third one may also be determined and conveyed as per the below, and so on.

At next block 1230, a preamble is transmitted. The preamble has a delimiter with a substantially constant duration, and protocol portion that encodes the first communication parameter, and the second one if it has been determined.

At next block 1240, the reader exchanges data with at least one, or may be more RFID tags. The exchange is performed according to the first communication parameter, and the second one if it has been determined. Exchanging data may include transmitting data, receiving data, or both.

Figure 13:
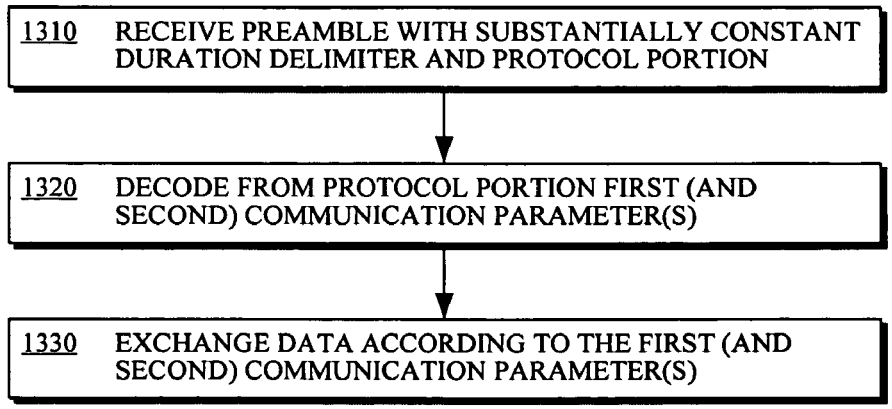
FIG. 13 is a flowchart illustrating a method for an RFID tag according to an embodiment of the invention.

FIG. 13 is flowchart 1300 illustrating a method for an RFID tag according to another embodiment of the invention. The method of flowchart 1300 may be practiced by different embodiments of the invention, including but not limited to tag 120.

At block 1310, a preamble is received that has a substantially constant duration delimiter, and protocol portion.

At next block 1320, a first communication parameter is decoded from the protocol portion. Optionally, a second communication parameter and a third one are decoded, if available. The tag then adjusts.

At next block 1330, the tag exchanges data with an RFID according to the decoded communication parameter(s).

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related document.

The invention claimed is:

1. An RFID reader adapted to at least:
   transmit to an RFID tag a preamble that includes a delimiter portion of a duration substantially equal to a preset delimiter duration, and a protocol portion that encodes a first communication parameter other than a transmission data rate of the reader; and
   then exchange data with the tag according to the first communication parameter.

2. The RFID reader of claim 1, wherein the reader is further adapted to:
   determine the first communication parameter for encoding in the protocol portion.

3. The RFID reader of claim 1, wherein
   the preset delimiter duration is one of approximately 12.5 μsec and approximately 6.25 μsec.

4. The RFID reader of claim 1, wherein
   the protocol portion includes a pattern that identifies the start of a transmission of data, and
   the first communication parameter is encoded in a timing of features of the pattern.

5. The RFID reader of claim 4, wherein
   the pattern includes a pulse, and
   the timing is that of a duration of the pulse.

6. The RFID reader of claim 4, wherein
   the pattern includes a pulse, and
   the timing is that of a duty cycle of the pulse.

7. The RFID reader of claim 1, wherein
   the protocol portion includes a violation, and
   the first communication parameter is encoded in a variable duty cycle of the violation.

8. The RFID reader of claim 1, wherein
   the protocol portion includes a violation, and
   the first communication parameter is encoded in a duration of the violation.

9. The RFID reader of claim 1, wherein
   the protocol portion includes a violation and a group of auxiliary transitions, and
   the first communication parameter is encoded in a timing of the auxiliary transitions.

10. The RFID reader of claim 9, wherein
    at least a portion of the group of auxiliary transitions occurs before the violation.

11. The RFID reader of claim 9, wherein
    at least a portion of the group of auxiliary transitions occurs after the violation.

12. The RFID reader of claim 1, wherein
    the first communication parameter is associated with a desired mode of encoding symbols by the tag.

13. The RFID reader of claim 1, wherein
    the first communication parameter is associated with a desired backscatter rate of the tag.

14. The RFID reader of claim 13, wherein
    the backscatter rate of the tag is to be determined also from the transmission data rate.

15. The RFID reader of claim 1, wherein
    the data is encoded in terms of at least two symbols having different symbol durations, and the first communication parameter is associated with one of a ratio of the symbol durations and a suggested checkpoint value for the symbols.

16. The RFID reader of claim 1, wherein
a second communication parameter is encoded in the protocol portion, and
exchanging data is performed also according to the second communication parameter.

17. The RFID reader of claim 16, wherein
one of the first and second communication parameters is associated with a desired mode of encoding symbols by the tag.

18. The RFID reader of claim 16, wherein
one of the first and second communication parameters is associated with a desired backscatter rate of the tag.

19. The RFID reader of claim 18, wherein
the backscatter rate of the tag is to be determined also from the transmission data rate.

20. The RFID reader of claim 18, wherein
the data is encoded in terms of at least two symbols having different symbol durations, and
one of the first and second communication parameters is associated with one of a ratio of the symbol durations and a suggested checkpoint value for the symbols.

21. A device comprising:
means for transmitting to an RFID tag a preamble that includes a delimiter portion of a duration substantially equal to a preset delimiter duration, and a protocol portion that encodes a first communication parameter other than a transmission data rate of the reader; and
means for exchanging data with the tag according to the transmitted first communication parameter.

22. The device of claim 21, further comprising:
means for determining the first communication parameter for encoding in the protocol portion.

23. The device of claim 21, wherein
the preset delimiter duration is one of approximately 12.5 μsec and approximately 6.25 μsec.

24. The device of claim 21, wherein
the protocol portion includes a pattern that identifies the start of a transmission of data, and
the first communication parameter is encoded in a timing of features of the pattern.

25. The device of claim 24, wherein
the pattern includes a pulse, and
the timing is that of a duration of the pulse.

26. The device of claim 24, wherein
the pattern includes a pulse, and
the timing is that of a duty cycle of the pulse.

27. The device of claim 21, wherein
the protocol portion includes a violation, and
the first communication parameter is encoded in a variable duty cycle of the violation.

28. The device of claim 21, wherein
the protocol portion includes a violation, and
the first communication parameter is encoded in a duration of the violation.

29. The device of claim 21, wherein
the protocol portion includes a violation and a group of auxiliary transitions, and
the first communication parameter is encoded in a timing of the auxiliary transitions.

30. The device of claim 29, wherein
at least a portion of the group of auxiliary transitions occurs before the violation.

31. The device of claim 29, wherein
at least a portion of the group of auxiliary transitions occurs after the violation.

32. The device of claim 21, wherein
the first communication parameter is associated with a desired mode of encoding symbols by the tag.

33. The device of claim 21, wherein
the first communication parameter is associated with a desired backscatter rate of the tag.

34. The device of claim 33, wherein
the backscatter rate of the tag is to be determined also from the transmission data rate.

35. The device of claim 21, wherein
the data is encoded in terms of at least two symbols having different symbol durations, and
the first communication parameter is associated with one of a ratio of the symbol durations and a suggested checkpoint value for the symbols.

36. The device of claim 21, wherein
a second communication parameter is encoded in the protocol portion, and exchanging data is performed also according to the second communication parameter.

37. The device of claim 36, wherein
one of the first and second communication parameters is associated with a desired mode of encoding symbols by the tag.

38. The device of claim 36, wherein
one of the first and second communication parameters is associated with a desired backscatter rate of the tag.

39. The device of claim 38, wherein
the backscatter rate of the tag is to be determined also from the transmission data rate.

40. The device of claim 36, wherein
the data is encoded in terms of at least two symbols having different symbol durations, and
one of the first and second communication parameters is associated with one of a ratio of the symbol durations and a suggested checkpoint value for the symbols.

41. A method for an RFID reader, comprising:
transmitting to an RFID tag a preamble that includes a delimiter portion of a duration substantially equal to a preset delimiter duration, and a protocol portion that encodes a first communication parameter other than a transmission data rate of the reader; and
then exchanging data with the tag according to the first communication parameter.

42. The method of claim 41, further comprising:
determining the first communication parameter for encoding in the protocol portion.

43. The method of claim 41, wherein
the preset delimiter duration is one of approximately 12.5 μsec and approximately 6.25 μsec.

44. The method of claim 41, wherein
the protocol portion includes a pattern that identifies the start of a transmission of data, and
the first communication parameter is encoded in a timing of features of the pattern.

45. The method of claim 43, wherein
the pattern includes a pulse, and
the timing is that of a duration of the pulse.

46. The method of claim 43, wherein
the pattern includes a pulse, and
the timing is that of a duty cycle of the pulse.

47. The method of claim 41, wherein
the protocol portion includes a violation, and
the first communication parameter is encoded in a variable duty cycle of the violation.

48. The method of claim 41, wherein
the protocol portion includes a violation, and
the first communication parameter is encoded in a duration of the violation.

49. The method of claim 41, wherein
the protocol portion includes a violation and a group of auxiliary transitions, and
the first communication parameter is encoded in a timing of the auxiliary transitions.

50. The method of claim 49, wherein
at least a portion of the group of auxiliary transitions occurs before the violation.

51. The method of claim 49, wherein
at least a portion of the group of auxiliary transitions occurs after the violation.

52. The method of claim 41, wherein
the first communication parameter is associated with a desired mode of encoding symbols by the tag.

53. The method of claim 41, wherein
the first communication parameter is associated with a desired backscatter rate of the tag.

54. The method of claim 53, wherein
the backscatter rate of the tag is to be determined also from the transmission data rate.

55. The method of claim 41, wherein
the data is encoded in terms of at least two symbols having different symbol durations, and
the first communication parameter is associated with one of a ratio of the symbol durations and a suggested checkpoint value for the symbols.

56. The method of claim 41, wherein
a second communication parameter is encoded in the protocol portion, and
exchanging data is performed also according to the second communication parameter.

57. The method of claim 56, wherein
one of the first and second communication parameters is associated with a desired mode of encoding symbols by the tag.

58. The method of claim 56, wherein
one of the first and second communication parameters is associated with a desired backscatter rate of the tag.

59. The method of claim 58, wherein
the backscatter rate of the tag is to be determined also from the transmission data rate.

60. The method of claim 56, wherein
the data is encoded in terms of at least two symbols having different symbol durations, and
one of the first and second communication parameters is associated with one of a ratio of the symbol durations and a suggested checkpoint value for the symbols.

61. An RFID tag adapted to at least:
receive from an RFID reader a preamble that includes a delimiter portion of a duration substantially equal to a preset delimiter duration, and a protocol portion;
decode from the protocol portion a first communication parameter other than a transmission data rate of the reader; and
then exchange data with the reader according to the decoded first communication parameter.

62. The RFID tag of claim 61, wherein
the preset delimiter duration is one of approximately 12.5 μsec and approximately 6.25 μsec.

63. The RFID tag of claim 61, wherein
the protocol portion includes a pattern that identifies the start of a transmission of data, and
the first communication parameter is encoded in a timing of features of the pattern.

64. The RFID tag of claim 63, wherein
the pattern includes a pulse, and
the timing is that of a duration of the pulse.

65. The RFID tag of claim 63, wherein
the pattern includes a pulse, and
the timing is that of a duty cycle of the pulse.

66. The RFID tag of claim 61, wherein
the protocol portion includes a violation, and
the first communication parameter is decoded from a variable duty cycle of the violation.

67. The RFID tag of claim 61, wherein
the protocol portion includes a violation, and
the first communication parameter is decoded from a duration of the violation.

68. The RFID tag of claim 61, wherein
the protocol portion includes a violation and a group of auxiliary transitions, and
the first communication parameter is encoded in a timing of the auxiliary transitions.

69. The RFID tag of claim 68, wherein
at least a portion of the group of auxiliary transitions occurs before the violation.

70. The RFID tag of claim 68, wherein
at least a portion of the group of auxiliary transitions occurs after the violation.

71. The RFID tag of claim 61, wherein
the first communication parameter is associated with a desired mode of encoding symbols by the tag.

72. The RFID tag of claim 61, wherein
the first communication parameter is associated with a desired backscatter rate of the tag.

73. The RFID tag of claim 72, wherein
the backscatter rate of the tag is determined also from the transmission data rate.

74. The RFID tag of claim 61, wherein
the data is encoded in terms of at least two symbols having different symbol durations, and
the first communication parameter is associated with one of a ratio of the symbol durations and a suggested checkpoint value for the symbols.

75. The RFID tag of claim 61, wherein
a second communication parameter is encoded in the protocol portion, and exchanging data is performed also according to the second communication parameter.

76. The RFID tag of claim 75, wherein
one of the first and second communication parameters is associated with a desired mode of encoding symbols by the tag.

77. The RFID tag of claim 75, wherein
one of the first and second communication parameters is associated with a desired backscatter rate of the tag.

78. The RFID tag of claim 77, wherein
the backscatter rate of the tag is determined also from the transmission data rate.

79. The RFID tag of claim 75, wherein
the data is encoded in terms of at least two symbols having different symbol durations, and
one of the first and second communication parameters is associated with one of a ratio of the symbol durations and a suggested checkpoint value for the symbols.

80. A device comprising:
means for receiving from an RFID reader a preamble that includes a delimiter portion of a duration substantially equal to a preset delimiter duration, and a protocol portion;

means for decoding from the protocol portion a first communication parameter other than a transmission data rate of the reader; and means for exchanging data with the reader according to the decoded first communication parameter.

81. The device of claim 80, wherein
the preset delimiter duration is one of approximately 12.5 μsec and approximately 6.25 μsec.

82. The device of claim 80, wherein
the protocol portion includes a pattern that identifies the start of a transmission of data, and
the first communication parameter is encoded in a timing of features of the pattern.

83. The device of claim 82, wherein
the pattern includes a pulse, and
the timing is that of a duration of the pulse.

84. The device of claim 82, wherein
the pattern includes a pulse, and
the timing is that of a duty cycle of the pulse.

85. The device of claim 80, wherein
the protocol portion includes a violation, and
the first communication parameter is decoded from a variable duty cycle of the violation.

86. The device of claim 80, wherein
the protocol portion includes a violation, and
the first communication parameter is decoded from a duration of the violation.

87. The device of claim 80, wherein
the protocol portion includes a violation and a group of auxiliary transitions, and
the first communication parameter is encoded in a timing of the auxiliary transitions.

88. The device of claim 87, wherein
at least a portion of the group of auxiliary transitions occurs before the violation.

89. The device of claim 87, wherein
at least a portion of the group of auxiliary transitions occurs after the violation.

90. The device of claim 80, wherein
the first communication parameter is associated with a desired mode of encoding symbols by the tag.

91. The device of claim 80, wherein
the first communication parameter is associated with a desired backscatter rate of the tag.

92. The device of claim 91, wherein
the backscatter rate of the tag is determined also from the transmission data rate.

93. The device of claim 80, wherein
the data is encoded in terms of at least two symbols having different symbol durations, and
the first communication parameter is associated with one of a ratio of the symbol durations and a suggested checkpoint value for the symbols.

94. The device of claim 80, wherein
a second communication parameter is encoded in the protocol portion, and
exchanging data is performed also according to the second communication parameter.

95. The device of claim 94, wherein
one of the first and second communication parameters is associated with a desired mode of encoding symbols by the tag.

96. The device of claim 94, wherein
one of the first and second communication parameters is associated with a desired backscatter rate of the tag.

97. The device of claim 96, wherein
the backscatter rate of the tag is determined also from the transmission data rate.

98. The device of claim 94, wherein
the data is encoded in terms of at least two symbols having different symbol durations, and
one of the first and second communication parameters is associated with one of a ratio of the symbol durations and a suggested checkpoint value for the symbols.

99. A method for an RFID tag, comprising:
receiving from an RFID reader a preamble that includes a delimiter portion of a duration substantially equal to a preset delimiter duration, and a protocol portion;
decoding from the protocol portion a first communication parameter other than a transmission data rate of the reader; and
then exchanging data with the reader according to the first communication parameter.

100. The method of claim 99, wherein
the preset delimiter duration is one of approximately 12.5 μsec and approximately 6.25 μsec.

101. The method of claim 99, wherein
the protocol portion includes a pattern that identifies the start of a transmission of data, and
the first communication parameter is encoded in a timing of features of the pattern.

102. The method of claim 101, wherein
the pattern includes a pulse, and
the timing is that of a duration of the pulse.

103. The method of claim 101, wherein
the pattern includes a pulse, and
the timing is that of a duty cycle of the pulse.

104. The method of claim 99, wherein
the protocol portion includes a violation, and
the first communication parameter is decoded from a variable duty cycle of the violation.

105. The method of claim 99, wherein
the protocol portion includes a violation, and
the first communication parameter is decoded from a duration of the violation.

106. The method of claim 99, wherein
the protocol portion includes a violation and a group of auxiliary transitions, and
the first communication parameter is encoded in a timing of the auxiliary transitions.

107. The method of claim 106, wherein
at least a portion of the group of auxiliary transitions occurs before the violation.

108. The method of claim 106, wherein
at least a portion of the group of auxiliary transitions occurs after the violation.

109. The method of claim 99, wherein
the first communication parameter is associated with a desired mode of encoding symbols by the tag.

110. The method of claim 99, wherein
the first communication parameter is associated with a desired backscatter rate of the tag.

111. The method of claim 110, wherein
the backscatter rate of the tag is determined also from the transmission data rate.

112. The method of claim 99, wherein
the data is encoded in terms of at least two symbols having different symbol durations, and
the first communication parameter is associated with one of a ratio of the symbol durations and a suggested checkpoint value for the symbols.

113. The method of claim 99, wherein
a second communication parameter is encoded in the protocol portion, and exchanging data is performed also according to the second communication parameter.

114. The method of claim 113, wherein
one of the first and second communication parameters is associated with a desired mode of encoding symbols by the tag.

115. The method of claim 113, wherein
one of the first and second communication parameters is associated with a desired backscatter rate of the tag.

116. The method of claim 115, wherein
the backscatter rate of the tag is determined also from the transmission data rate.

117. The method of claim 113, wherein
the data is encoded in terms of at least two symbols having different symbol durations, and
one of the first and second communication parameters is associated with one of a ratio of the symbol durations and a suggested checkpoint value for the symbols.

* * * * *

UNITED STATES PATENT AND TRADEMARK OFFICE
CERTIFICATE OF CORRECTION

PATENT NO. : 7,501,953 B2 Page 1 of 1
APPLICATION NO. : 10/890976
DATED : March 10, 2009
INVENTOR(S) : Christopher J. Diorio et al.

It is certified that error appears in the above-identified patent and that said Letters Patent is hereby corrected as shown below:

Title Page

Insert Item --(73) Assignee: IMPINJ, INC., Seattle, WA--.

Signed and Sealed this

Twenty-third Day of June, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,501,953 B2  
APPLICATION NO. : 10/890976  
DATED : March 10, 2009  
INVENTOR(S) : Christopher J. Diorio et al.

It is certified that error appears in the above-identified patent and that said Letters Patent is hereby corrected as shown below:

Title Page

Delete the title page and substitute therefore the attached title page.

Insert Item --(73) Assignee: IMPINJ, INC., Seattle, WA--.

--(74) Attorney, Agent, or Firm − Blakely, Sokoloff, Taylor & Zafman, LLP--.

This certificate supersedes the Certificate of Correction issued June 23, 2009.

Signed and Sealed this

Fourth Day of August, 2009

JOHN DOLL  
*Acting Director of the United States Patent and Trademark Office*

(12) United States Patent
Diorio et al.

(10) Patent No.: US 7,501,953 B2
(45) Date of Patent: Mar. 10, 2009

(54) RFID READERS TRANSMITTING PREAMBLES DENOTING COMMUNICATION PARAMETERS AND RFID TAGS INTERPRETING THE SAME AND METHODS

(75) Inventors: Christopher J. Diorio, 17001 NW. 15th Ave., Shoreline, WA (US) 98177; Scott Anthony Cooper, 7315 Earl Ave. NW., Seattle, WA (US) 98117

(73) Assignee: IMPINJ, INC., Seattle, WA ( * ) Notice: Subject to any disclaimer, the term of this patent is extended or adjusted under 35 U.S.C. 154(b) by 996 days.

(21) Appl. No.: 10/890,976

(22) Filed: Jul. 13, 2004

(65) Prior Publication Data
US 2005/0225447 A1    Oct. 13, 2005

Related U.S. Application Data

(63) Continuation-in-part of application No. 10/823,991, filed on Apr. 13, 2004, now Pat. No. 7,183,926.

(60) Provisional application No. 60/570,247, filed on May 11, 2004.

(51) Int. Cl.
  H04Q 5/22   (2006.01)
  H04Q 1/30   (2006.01)
  G08B 13/14  (2006.01)
  G08B 5/22   (2006.01)
  H04L 7/00   (2006.01)

(52) U.S. Cl. .............. 340/572.4; 340/10.3; 340/7.43; 340/825.21

(58) Field of Classification Search ............ 370/468, 370/470, 471, 473; 340/10.1–10.51, 572.1–572.9, 340/7.43, 825.2, 825.21; 455/41.2, 41.3, 455/556.1, 556.2, 136; 709/209, 233, 224, 709/237
See application file for complete search history.

(56) References Cited

U.S. PATENT DOCUMENTS

| | | | |
|---|---|---|---|
| 4,701,755 A * | 10/1987 | Nakagawa et al. | 340/825.02 |
| 4,783,783 A | 11/1988 | Nagai et al. | |
| 4,935,702 A | 6/1990 | Mead et al. | |
| 5,164,942 A * | 11/1992 | Kamerman et al. | 370/334 |
| 5,307,515 A | 4/1994 | Kuo et al. | |
| 5,491,484 A | 2/1996 | Schuermann | |
| 5,640,151 A * | 6/1997 | Reis et al. | 340/10.2 |

(Continued)

FOREIGN PATENT DOCUMENTS

EP    0 298 618    1/1989

(Continued)

OTHER PUBLICATIONS

Invitation to Pay Additional Fees (Partial International Search), Application No. PCT/US 03/31792, date of mailing Apr. 22, 2004.

(Continued)

*Primary Examiner*—Benjamin C Lee
*Assistant Examiner*—Jennifer Mehmood
(74) *Attorney, Agent, or Firm*—Blakely, Sokoloff Taylor & Zafman, LLP

(57) ABSTRACT

RFID readers transmit data to query RFID tags. Before transmitting the data, the RFID readers also transmit special preambles that inform of parameters of communication that are to be used. RFID tags decode the preamble, and adjust accordingly to optimize the communication. The preambles of the invention start with a delimiter that has a substantially constant duration regardless of the communication parameters that will be used, such as transmission data rate.

117 Claims, 9 Drawing Sheets

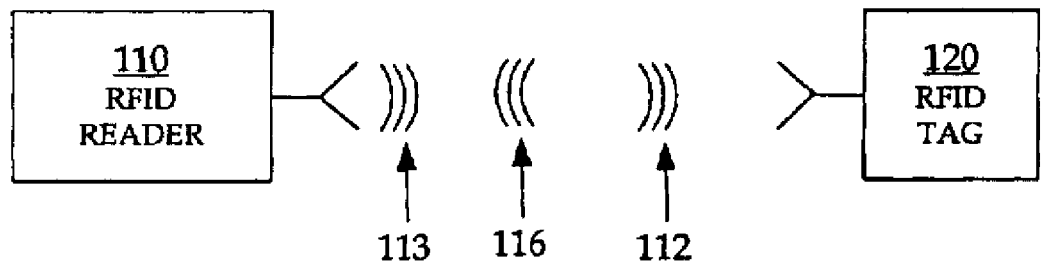

UNITED STATES PATENT AND TRADEMARK OFFICE
CERTIFICATE OF CORRECTION

PATENT NO. : 7,501,953 B2
APPLICATION NO. : 10/890976
DATED : March 10, 2009
INVENTOR(S) : Diorio et al.

It is certified that error appears in the above-identified patent and that said Letters Patent is hereby corrected as shown below:

Please delete "18" in claim 20, column 9, line 20 and insert --16--, therefor.

Please delete "43" in claim 45, column 10, line 58 and insert --44--, therefor.

Please delete "43" in claim 46, column 10, line 61 and insert --44--, therefor.

Signed and Sealed this

Nineteenth Day of January, 2010

David J. Kappos
*Director of the United States Patent and Trademark Office*